United States Patent
Kataoka

(10) Patent No.: US 9,311,474 B2
(45) Date of Patent: Apr. 12, 2016

(54) INFORMATION PROCESSING APPARATUS, INFORMATION PROCESSING METHOD, PROGRAM, STORAGE MEDIUM, AND INFORMATION PROCESSING SYSTEM

(71) Applicant: MITUTOYO CORPORATION, Kanagawa (JP)

(72) Inventor: Masanobu Kataoka, Miyazaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 15 days.

(21) Appl. No.: 14/332,734

(22) Filed: Jul. 16, 2014

(65) Prior Publication Data

US 2015/0047013 A1 Feb. 12, 2015

(30) Foreign Application Priority Data

Aug. 7, 2013 (JP) .................................. 2013-164428

(51) Int. Cl.
| | | |
|---|---|---|
| *G06F 21/00* | (2013.01) | |
| *G06F 21/44* | (2013.01) | |
| *G06F 7/04* | (2006.01) | |
| *G06F 12/14* | (2006.01) | |
| *G06F 12/16* | (2006.01) | |
| *G06F 17/30* | (2006.01) | |
| *G06F 13/00* | (2006.01) | |

(52) U.S. Cl.
CPC ........ *G06F 21/44* (2013.01); *G06F 2221/2129* (2013.01)

(58) Field of Classification Search
None
See application file for complete search history.

(56) References Cited

U.S. PATENT DOCUMENTS

| 6,487,646 | B1 * | 11/2002 | Adams et al. ................. 711/163 |
| 6,934,852 | B2 * | 8/2005 | Daniels et al. ..................... 726/3 |
| 7,676,945 | B2 | 3/2010 | Prestidge et al. |
| 8,437,978 | B2 | 5/2013 | Prestidge et al. |
| 8,700,351 | B2 | 4/2014 | Prestidge et al. |
| 8,782,804 | B2 * | 7/2014 | Nagai et al. ..................... 726/28 |
| 2005/0168323 | A1 * | 8/2005 | Lenoir et al. ................. 340/5.74 |
| 2007/0192831 | A1 * | 8/2007 | Hashidate ......................... 726/2 |
| 2007/0234060 | A1 * | 10/2007 | Tsubono ....................... 713/176 |
| 2008/0235774 | A1 * | 9/2008 | Tsuyuzaki ........................ 726/7 |
| 2008/0271163 | A1 * | 10/2008 | Stillerman et al. ............. 726/30 |
| 2010/0097179 | A1 * | 4/2010 | Hayashida .................... 340/5.82 |
| 2013/0339713 | A1 * | 12/2013 | Huang .............................. 713/2 |
| 2014/0237611 | A1 * | 8/2014 | Dent ............................... 726/26 |

FOREIGN PATENT DOCUMENTS

| EP | 2019284 A2 | 7/2008 |
| JP | 2009-80102 A | 4/2009 |

\* cited by examiner

*Primary Examiner* — Shin-Hon Chen
(74) *Attorney, Agent, or Firm* — Greenblum & Bernstein, P.L.C.

(57) ABSTRACT

Provided is an information processing apparatus configured to execute at least one function, including: a storage configured to store a first code; an authentication unit configured to obtain a second code from an external storage medium, and to verify the second code against the first code to thereby authenticate the second code; an execution allowing unit configured, when the authentication unit succeeds in authentication, to allow execution of a predetermined function out of the at least one function; and an update unit configured, when the authentication unit succeeds in authentication, to update the first code stored in the storage with another first code, and to update the second code stored in the external storage medium with another second code such that the authentication unit will succeed in authentication based on the updated first code.

10 Claims, 11 Drawing Sheets

INFORMATION PROCESSING APPARATUS, INFORMATION PROCESSING METHOD, PROGRAM, STORAGE MEDIUM, AND INFORMATION PROCESSING SYSTEM

CROSS REFERENCE TO RELATED APPLICATIONS

This application claims the benefit of Japanese Priority Patent Application JP 2013-164428 filed Aug. 7, 2013, the entire contents of which are incorporated herein by reference.

BACKGROUND

The present invention relates to an information processing apparatus, an information processing method, a program, a storage medium, and an information processing system capable of using a measuring apparatus or the like properly.

Japanese Patent Application Laid-open No. 2009-80102 discloses a measuring probe (e.g., coordinate length measuring machine, machine tool, or inspection robot) configured to measure an object. The measuring probe sends/receives various data such as measured data to/from an associated unit. Examples of the associated unit include a computer, hardware connecting to a computer such as a dongle, an interface configured to communicate with a computer, and the like. Further, other disclosed examples of the associated unit include an actuation button, a smart card, and the like configured to update data stored in the measuring probe (paragraphs [0013], [0014], etc. of Japanese Patent Application Laid-open No. 2009-80102).

The measuring probe disclosed in Japanese Patent Application Laid-open No. 2009-80102 includes an authentication module configured to confirm if an associated unit (i.e., the other end of communication) is authentic. If the authentication module confirms authenticity of the associated unit, for example, it is possible to load various data such as data for updating firmware. Further, the measuring probe is allowed to send measured data to the associated unit. As a result, for example, it is possible to prevent a third party from using an incompatible measuring probe and from manufacturing a counterfeit measuring probe (paragraphs [0005], [0007], etc. of Japanese Patent Application Laid-open No. 2009-80102).

SUMMARY

As described above, it is required to provide a high-security measuring system capable of preventing a third party from using the measuring system unrightfully.

In view of the above-mentioned circumstances, it is desirable to provide an information processing method, a program, a storage medium, and an information processing system capable of realizing a high-security measuring system.

Moreover, it is further desirable to provide an information processing apparatus and the like capable of realizing a high-security network system.

To attain the above-mentioned objects, according to an embodiment of the present invention, there is provided an information processing apparatus configured to execute at least one function, including:

a storage configured to store a first code;
an authentication unit configured
to obtain a second code from an external storage medium, and
to verify the second code against the first code to thereby authenticate the second code;

an execution allowing unit configured, when the authentication unit succeeds in authentication, to allow execution of a predetermined function out of the at least one function; and an update unit configured, when the authentication unit succeeds in authentication,
to update the first code stored in the storage with another first code, and
to update the second code stored in the external storage medium with another second code such that the authentication unit will succeed in authentication based on the updated first code.

The information processing apparatus verifies the second code obtained from the external storage medium against the first code, to thereby authenticate the second code. When authentication is successfully executed, the information processing apparatus is allowed to execute a predetermined function. Further, when authentication is successfully executed, the first code is updated with another first code, and the second code is updated with another second code such that authentication is successfully executed. Because the first and second codes are updated automatically, for example, even when the second code is leaked, it is possible to minimize the effect thereof. According to the information processing apparatus, it is possible to realize a high-security measuring system.

The storage may be configured to store a plurality of pieces of identification information identifying a plurality of external storage media, respectively, and a plurality of first codes in relation with the plurality of pieces of identification information, respectively. In this case, the authentication unit may be configured to verify the second code stored in a target storage medium out of the plurality of external storage media against the first code in relation with a piece of identification information of the target storage medium out of the plurality of first codes to thereby authenticate the second code, the target storage medium being an authentication-target. Here, the update unit may be configured, when the authentication unit succeeds in authentication, to update the first code in relation with the piece of identification information of the target storage medium, and to update the second code stored in the target storage medium.

The information processing apparatus authenticates each of the plurality of external storage media. As a result, for example, a plurality of managers and the like may manage the system. Further, one of the plurality of external storage media may be kept as a spare USB memory.

The information processing apparatus may further include a first output unit configured, when the authentication unit succeeds in authentication, to output a first GUI (Graphical User Interface) for setting the predetermined function, execution of the predetermined function being allowed.

In this case, the execution allowing unit may be configured to allow execution of the predetermined function set by using the GUI.

The information processing apparatus is capable of arbitrarily setting a function, execution of the function being allowed. As a result, for example, a manager or the like of the system, who owns the external storage medium, is capable of easily restricting functions such that other users owning no external storage media may not use the functions.

The storage may be configured to store a plurality of pieces of identification information identifying a plurality of external storage media, respectively, and a plurality of first codes in relation with the plurality of pieces of identification information, respectively. In this case, the authentication unit may be configured to verify the second code stored in a target storage medium out of the plurality of external storage media against the first code in relation with a piece of identification information of the target storage medium out of the plurality of first codes to thereby authenticate the second code, the target storage medium being an authentication-target. The update unit may be configured, when the authentication unit succeeds in authentication, to update the first code in relation with the piece of identification information of the target storage medium, and to update the second code stored in the target storage medium.

The information processing apparatus may further include a second output unit configured, when the authentication unit succeeds in authentication, to output a second GUI for setting up the external storage medium, verification of the external storage medium being disabled, out of the plurality of external storage media.

In this case, the storage may be configured to store a piece of identification information of the external storage medium, disablement of verification of the external storage medium being set by using the second GUI, and information on disablement of verification in association with each other.

The information processing apparatus may arbitrarily set up an external storage medium, verification of the external storage medium being disabled. Because of this, for example, when one of the plurality of storage media is lost, verification of the lost storage medium may be disabled. As a result, it is possible to prevent the lost external storage medium from being used unrightfully. For example, an external storage medium for enabling/disabling verification may be kept as a spare external storage medium.

The information processing apparatus may further include an information setting unit configured to provide the piece of identification information of the external storage medium, disablement of verification of the external storage medium being set, to another external storage medium, and to change the information on disablement of verification in association with the piece of identification information to information on enablement of verification.

In this case, the update unit may be configured to update the first code in relation with the piece of identification information provided to the other storage medium, and to cause the other external storage medium to store the second code such that the authentication unit will verify the second code against the updated first code to thereby succeed in authentication.

As a result, for example, another external storage medium may be used instead of a lost external storage medium or the like. At this time, because the first and second codes are newly set, the higher security is attained.

The information processing apparatus may further include an information obtaining unit configured to obtain information on the current time.

In this case, the storage may be configured to store information on a time period in which verification is allowed. Further, the authentication unit may be configured to execute verification based on the information on the current time when the current time is in the time period in which verification is allowed.

As described above, verification may be executed on the condition of time information. As a result, the higher security is attained.

The storage may be configured to store history information, the history information being time information at which verification is executed.

As described above, the storage may store history information of verification of external storage media. For example, with reference to the history information arbitrarily, a user may know when the information processing apparatus was used unrightfully or not.

The external storage medium may be a mobile storage medium.

Because of this, a manager or the like may own and use an external storage medium arbitrarily.

The external storage medium may be a memory including a USB (Universal Serial Bus) interface.

As described above, a memory (USB memory) including a USB interface may be used as an external storage medium.

According to another embodiment of the present invention, there is provided an information processing apparatus configured to execute at least one function, including:
  a storage configured to store a first code;
  an authentication unit configured
    to obtain a second code from an external storage medium via a network, and
    to verify the second code against the first code to thereby authenticate the second code;
  an execution allowing unit configured, when the authentication unit succeeds in authentication, to allow execution of a predetermined function out of the at least one function; and
  an update unit configured, when the authentication unit succeeds in authentication,
    to update the first code stored in the storage with another first code, and
    to update the second code stored in the external storage medium with another second code via the network such that the authentication unit will succeed in authentication based on the updated first code.

The information processing apparatus obtains the second code via the network, and authenticates the second code. Further, when authentication is successfully executed, the second code is updated via the network, too. As a result, a high-security network system may be realized.

According to the present invention, there is provided an information processing method, executed by a computer configured to execute at least one function, the information processing method including:
  storing a first code;
  obtaining a second code from an external storage medium, and verifying the second code against the first code to thereby authenticate the second code;
  when the authentication is successfully executed, allowing execution of a predetermined function out of the at least one function; and
  when the authentication is successfully executed, updating the stored first code with another first code, and updating the second code stored in the external storage medium with another second code such that authentication will be successfully executed based on the updated first code.

According to the present invention, there is provided a program, causing a computer configured to execute at least one function to execute the steps of:
  storing a first code;
  obtaining a second code from an external storage medium, and verifying the second code against the first code to thereby authenticate the second code;
  when the authentication is successfully executed, allowing execution of a predetermined function out of the at least one function; and
  when the authentication is successfully executed, updating the stored first code with another first code, and updating the second code stored in the external storage medium with another second code such that authentication will be successfully executed based on the updated first code.

According to the present invention, there is provided a storage medium, including:

a connecting unit capable of connecting to an information processing apparatus configured to execute at least one function;

a storage configured to store a second code, the second code being to be verified against a first code stored in storage of the information processing apparatus for authentication of allowing execution of a predetermined function out of the at least one function; and an update unit configured to update the second code based on an instruction sent from the information processing apparatus when the authentication is successfully executed, the instruction instructing to update the second code with another second code such that authentication will be successfully executed based on the updated first code.

Such a storage medium enables a high-security measuring system.

According to the present invention, there is provided an information processing system, including:

an information processing apparatus configured to execute at least one function; and at least one external storage medium, wherein the at least one external storage medium is configured to store a unique first authentication code, and the information processing apparatus includes storage configured to store at least one second authentication code, an authentication unit configured
to obtain the first authentication code from the external storage medium, and
to verify the first authentication code against the second authentication code to thereby authenticate the first authentication code, an execution allowing unit configured, when the authentication unit succeeds in authentication, to allow execution of a predetermined function out of the at least one function, and an update unit configured, when the authentication unit succeeds in authentication,
to update the second authentication code stored in the storage with another second authentication code, and
to update the first authentication code stored in the external storage medium with another first authentication code such that the authentication unit will succeed in authentication based on the updated second authentication code.

As described above, according to the present invention, it is possible to realize a high-security measuring system.

DETAILED DESCRIPTION OF EMBODIMENTS

Hereinafter, embodiments of the present invention will be described with reference to the drawings.

First Embodiment

Configuration of Measuring System

Figure 1:
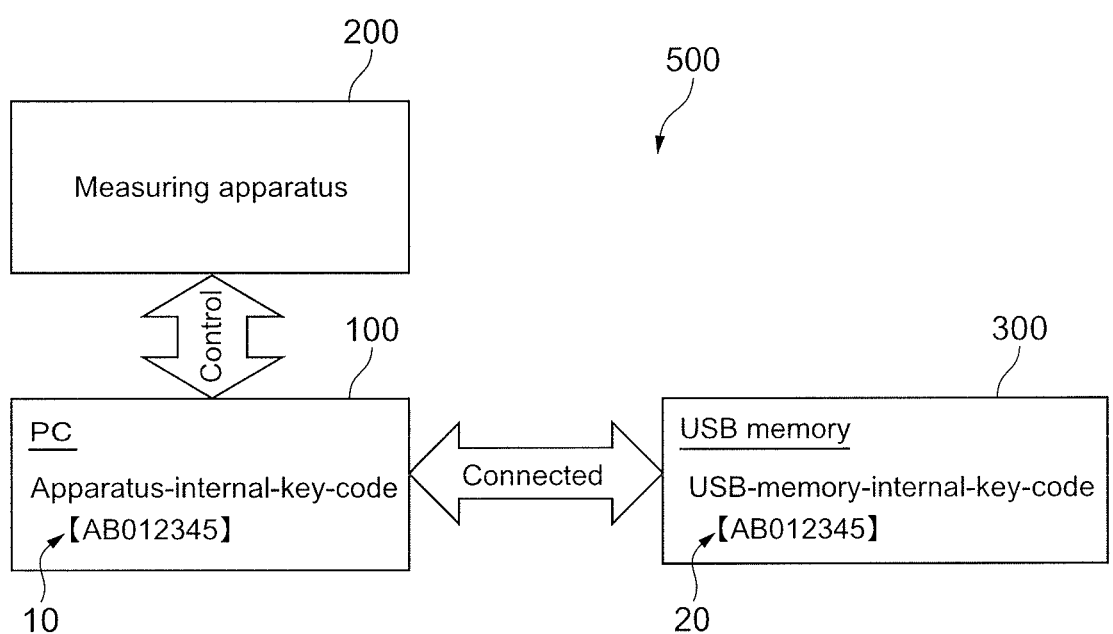
FIG. 1 is a diagram showing an example of the basic configuration of a measuring system according to a first embodiment of the present invention.

FIG. 1 is a diagram showing an example of the basic configuration of a measuring system (information processing system) according to a first embodiment of the present invention. The measuring system 500 includes the PC (Personal Computer) 100, the measuring apparatus 200, and the memory (USB memory) 300. The PC (Personal Computer) 100 controls behaviors of the measuring apparatus 200. The memory 300 connects to the PC 100 via a USB (Universal Serial Bus) interface. In this embodiment, the PC 100 corresponds to an "information processing apparatus configured to execute at least one function". Further, the USB memory 300 corresponds to an "external storage medium".

Any kind of measuring apparatus 200 may be used. The present invention is applicable to various measuring apparatuses such as, for example, an image measurer, a three-dimensional measurer, a coordinate meter, a surface roughness meter, a contour shape measurer, a circularity measurer, a hardness tester, a vibration meter, a digital microscope, and the like. Further, the PC 100 may execute any method of controlling the measuring apparatus 200. Note that the present invention may be applied to a system including an apparatus other than a measuring apparatus configured to measure a predetermined physical amount.

Figure 2:
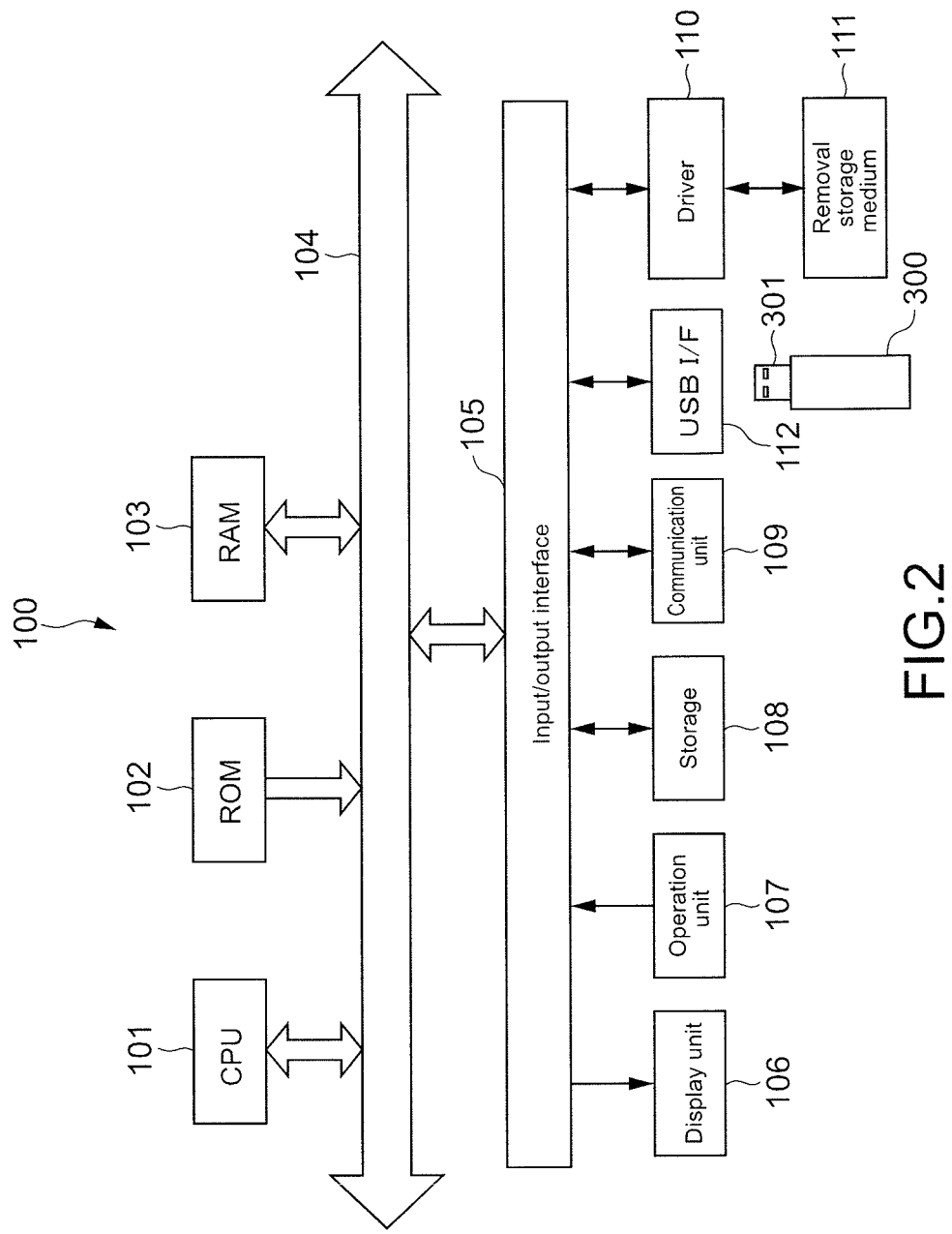
FIG. 2 is a block diagram schematically showing an example of the hardware configuration of a PC of this embodiment.

FIG. 2 is a block diagram schematically showing an example of the hardware configuration of the PC 100 of this embodiment. The PC 100 includes the CPU (Central Processing Unit) 101, the ROM (Read Only Memory) 102, the RAM (Random Access Memory) 103, the input/output interface 105, and the bus 104 connecting them with each other.

The display unit 106, the operation unit 107, the storage 108, the communication unit 109, the driver 110, the USB I/F (interface) 112, and the like connect to the input/output interface 105.

The display unit 106 is a display device using a liquid crystal, an EL (Electro-Luminescence), a CRT (Cathode Ray Tube), or the like, for example.

The operation unit 107 is a controller, a pointing device, a keyboard, a touchpad, or another operation device, for example. In the case where the operation unit 107 includes a touchpad, the touchpad and the display unit 106 may be formed integrally.

The storage 108 is a nonvolatile storage device such as a HDD (Hard Disk Drive), a flash memory, or another solid memory, for example. According to this embodiment, as shown in FIG. 1, the storage 108 stores an apparatus-internal-key-code [AB012345]. In this embodiment, the apparatus-internal-key-code corresponds to a "first code". Hereinafter, the apparatus-internal-key-code will be referred to as "first code 10". Further, the first code 10 stored in the storage 108 corresponds to a "second authentication code". The storage 108 stores other various kinds of data.

The driver 110 is a device capable of driving the removal storage medium 111 such as an optical storage medium, a magnetic storage tape, or the like, for example. To the contrary, the storage 108 mainly drives an unremovable storage medium, and is used as a device built in the PC 100 in most cases.

The communication unit 109 includes a modem, a router, and other communication devices, which are capable of connecting to a LAN, a WAN, and the like, and are configured to communicate with other devices. The communication unit 109 may communicate with other devices wiredly or wirelessly. The communication unit 109 is independent of the PC 100 in most cases.

The USB I/F 112 is a USB port, and is capable of connecting to a USB device including a USB connector (USB I/F). Any kind of USB port and any kind of USB connector may be employed. The USB memory 300 connects to the USB I/F 112. Note that the display unit 106, the operation unit 107, or the like may connect to the PC 100 via the USB port.

FIG. 2 does not mean that it is necessary to provide a USB port dedicated to connect to the USB memory 300. At least one USB port capable of connecting to the USB memory 300 has only to be prepared when the measuring system 500 operates.

Software stored in the storage 108 or the ROM 102 and the hardware resources of the PC 100 cooperatively execute information processing of the PC 100 having the above-mentioned hardware configuration. Specifically, a program configuring the software is stored in the storage 108, the ROM 102, or the like. The CPU 101 loads the program in the RAM 103, and executes the program.

The program is installed in the PC 100 via the storage medium 111, for example. Alternatively, the program may be installed in the PC 100 via a global network or the like. Further, the program executed by the PC 100 may be processed in time series, in parallel, or at a necessary timing (e.g., when program is called).

Note that a computer other than the PC 100 may be used as the information processing apparatus of this embodiment. Further, the measuring apparatus may include an information processor including a CPU and the like, and a USB I/F capable of connecting to a USB device. That is, a measuring apparatus integrally including the measuring apparatus 200 and the PC 100 of FIG. 1 may be used alternatively. If such a measuring apparatus is used, the measuring apparatus by itself functions as the information processing apparatus according to an embodiment of the present invention. The USB memory 300 connects to the USB I/F of the measuring apparatus directly. Further, the above-mentioned example of the hardware configuration of FIG. 2 or an example of software configuration of FIG. 3 (described below) corresponds to an example of the configuration of the information processor of the measuring apparatus.

The USB memory 300 includes the USB connector 301 (see FIG. 2), storage (not shown), and an update unit (not shown). The USB connector 301 connects to the USB I/F 112 of the PC 100. The USB connector 301 corresponds to a "connecting unit connected to an information processing apparatus configured to execute at least one function". The storage stores the USB-memory-internal-key-code [AB012345] of FIG. 1. The USB-memory-internal-key-code corresponds to a "second code", which is verified against the first code 10 stored in the storage 108 of the PC 100. Hereinafter, the USB-memory-internal-key-code will be referred to as "second code 20". Further, the second code 20 corresponds to a "first authentication code". An update unit updates the second code 20 in response to an instruction to update the second code 20 with another code, which is output from the PC 100. How to update a key code will be described later.

Figure 3:
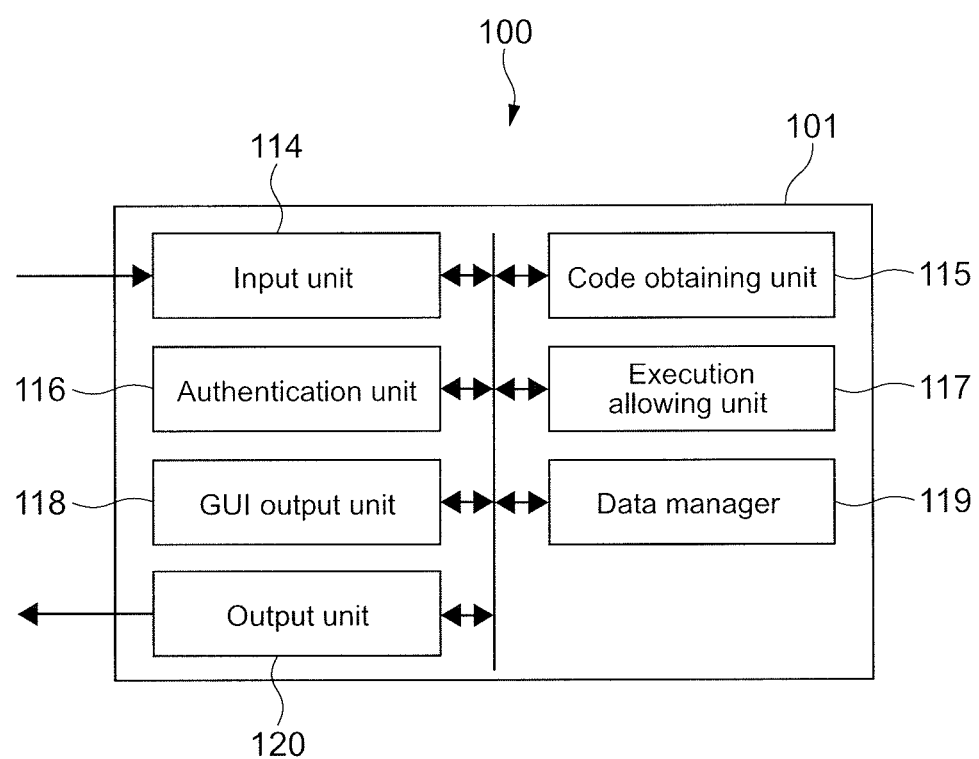
FIG. 3 is a block diagram schematically showing an example of the software configuration of the PC of this embodiment.

FIG. 3 is a block diagram schematically showing an example of the software configuration of the PC 100 according to this embodiment. The CPU 101 of the PC 100 executes a predetermined program, whereby the respective software blocks of FIG. 3 are realized. Alternatively, dedicated hardware may be used to realize the respective blocks. The blocks are operated, whereby the information processing method of this embodiment is executed.

The PC 100 includes the input unit 114, the code obtaining unit 115, the authentication unit 116, the execution allowing unit 117, the GUI (Graphical User Interface) output unit 118, the data manager 119, and the output unit 120.

Various data is input in the input unit 114. For example, data stored in the storage 108 and data stored in the USB memory 300 are input in the input unit 114. Data is input in the input unit 114 in response to instructions, requests, and the like from other devices and other blocks. The input unit 114 may output a data request and the like by itself.

Further, current-time-information is input in the input unit 114. The current-time-information may be obtained from an internal clock of the PC 100 or the measuring apparatus 200. Alternatively, the current-time-information is obtained from a network such as the Internet via the communication unit 109. In this embodiment, the input unit 114, in which various data including such current-time-information is input, functions as an information obtaining unit. Alternatively, the information obtaining unit may include the input unit 114, a block configured to output a data request, and other blocks.

The code obtaining unit 115 is configured to obtain the first code 10 stored in the storage 108 and the second code 20 stored in the storage of the USB memory 300.

The authentication unit 116 is configured to verify the second code 20 against the first code 10, and authenticates the second code 20. As shown in FIG. 1, in this embodiment, each of the first and second codes 10 and 20 is represented by a character code such as ASCII (American standard code for information interchange). Then the authentication unit 116 determines if the character code of the first code 10 matches the character code of the second code 20 or not. If the first code 10 matches the second code 20, authentication is successfully executed. If the first code 10 does not match the second code 20, authentication fails. Note that any kind of first and second codes 10 and 20 used as authentication data, any authentication method, and any authentication algorithm may be used.

The execution allowing unit 117 is configured to allow execution of a predetermined function out of one or more functions of the PC 100. For example, the execution allowing unit 117 may allow execution of a predetermined function of the measuring apparatus 200. Further, the execution allowing unit 117 may allow execution of functions of the PC 100 such as data processing. Further, execution of a predetermined function is restricted if the USB memory 300 does not connect to the PC 100, and then the execution allowing unit 117 may remove the restriction of the function. That is, here, "to allow execution of a predetermine function" also means to remove restriction of a function.

The GUI output unit 118 is configured to output GUIs to the display unit 106 or an external display apparatus. In response to an instruction from the GUI output unit 118, GUI data stored in the storage 108 or the like is retrieved and output to the display unit 106 or the like. As a result, a GUI is displayed on a display of the display unit 106 or the like. In this embodiment, the GUI output unit 118 functions as a first output unit and a second output unit.

The data manager 119 is configured to manage various data. For example, the data manager 119 updates the first and second codes 10 and 20. Further, for example, the data manager 119 sets and changes a time period in which verification is allowed, or updates history information. The history information is time information at which verification is executed. In addition, the data manager 119 manages various data.

The output unit 120 is configured to output various data. For example, the output unit 120 outputs results of authentication executed by the authentication unit 116, results of processing executed by the execution allowing unit 117, and the like. Further, the output unit 120 outputs instructions to output GUIs from the GUI output unit 118, instructions to update information from the data manager 119, and other instructions. The output unit 120 may output other data.

[Behavior of Measuring System]

Figure 4:
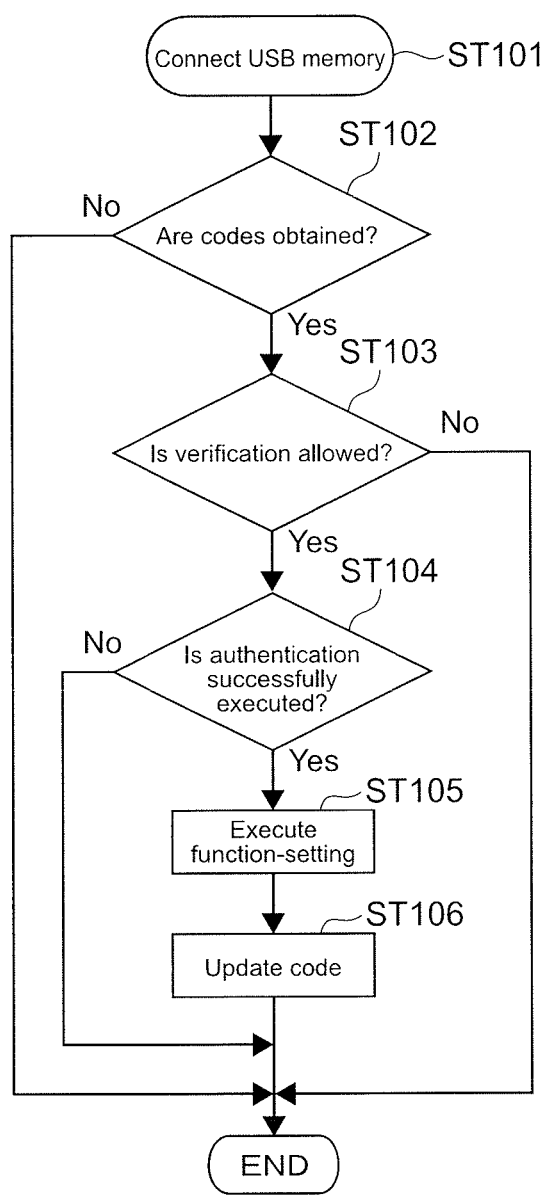
FIG. 4 is a flowchart showing an example of the behavior of a measuring system of this embodiment.

FIG. 4 is a flowchart showing an example of the behavior of the measuring system 500 of this embodiment. Each of FIG. 5 to FIG. 9 is a diagram illustrating each step of FIG. 4 and a connection status between the measuring apparatus 200 (PC 100) and the USB memory 300. Note that each of FIG. 5 to FIG. 9 illustrates an apparatus integrally including the measuring apparatus 200 and the PC 100 as the measuring apparatus 200 to make the drawings simple. That is, each of FIG. 5 to FIG. 9 illustrates the measuring apparatus 200 as an apparatus functioning as the information processing apparatus of this embodiment.

Figure 5:
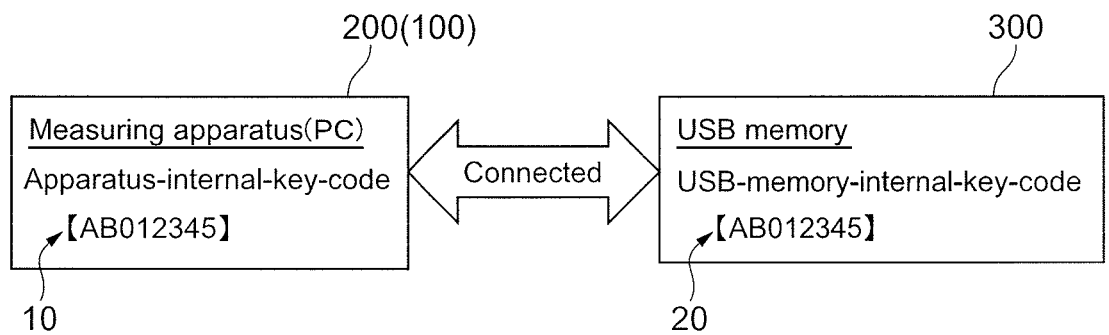
FIG. 5 is a diagram showing a status in which a USB memory connects to the measuring apparatus.

As shown in FIG. 5, the USB memory 300 connects to the measuring apparatus 200 (Step 101). The code obtaining unit 115 obtains the first and second codes 10 and 20. As the result of obtaining the codes, it is determined if the code obtaining unit 115 obtains the first and second codes 10 and 20 (Step 102). Specifically, it is determined if the code obtaining unit 115 obtains the second code 20 from the USB memory 300.

Figure 6:
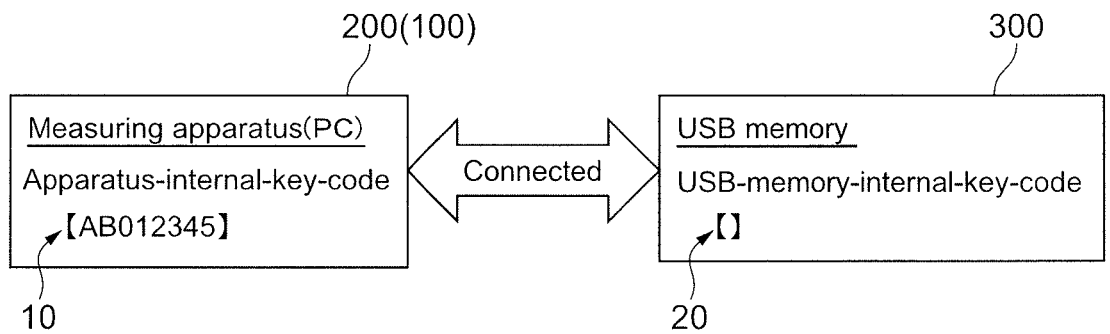
FIG. 6 is a diagram showing a status in which a USB memory storing no second code connects to the measuring apparatus.

For example, as shown in FIG. 6, if the USB memory 300 does not store the second code 20, the code obtaining unit 115 is not capable of obtaining the second code 20. In this case, it is determined that the code obtaining unit 115 is not capable of obtaining a code (No in Step 102), and the processing is completed.

Here, "to complete the processing" means that setting of a function, execution of the function being allowed, is completed (hereinafter simply referred to as "function-setting"). If a function, execution of the function being allowed, is preset, a user operates the measuring apparatus 200 within the allowed scope. In other words, if execution of a predetermined function out of one or more functions is restricted, a user operates the measuring apparatus 200 in the state where the function is restricted.

Sometimes execution of all the functions of the measuring apparatus 200 may be restricted, i.e., the whole use of the measuring apparatus 200 may be restricted. In this case, a user is capable of operating the measuring apparatus 200 only if the measuring apparatus 200 obtains the second code 20. As described above, restriction of the whole use of the measuring apparatus 200 may be set.

Figure 7:
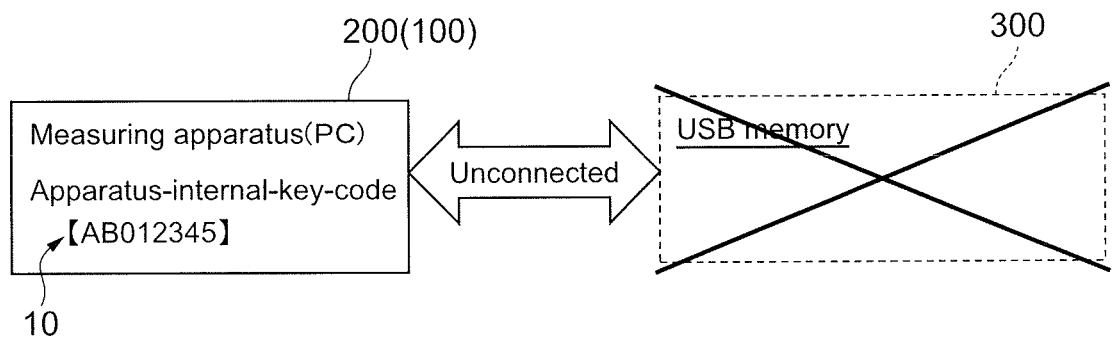
FIG. 7 is a diagram showing a status in which no USB memory connects to the measuring apparatus.

As a matter of course, as shown in FIG. 7, if the USB memory 300 does not connect to the measuring apparatus 200, function-setting is not executed, either. That is, if function-restriction is set, the measuring apparatus 200 is used under this status. If the whole use of the measuring apparatus 200 is restricted, it is not possible to use the measuring apparatus 200.

If the first and second codes 10 and 20 are obtained (Yes in Step 102), the authentication unit 116 determines if verification is allowed (Step 103). In this embodiment, the storage 108 stores information on a time period in which verification is allowed (hereinafter referred to as verification-allowed-time-period). The authentication unit 116 determines if the current time is in the verification-allowed-time-period based on the current-time-information. Further, if the current time is in the verification-allowed-time-period, the authentication unit 116 verifies the second code 20 against the first code 10 (Yes in Step 103, proceed to Step 104). If the current time is not in the verification-allowed-time-period (No in Step 103), the processing is completed.

For example, the time period from 10.00 to 10.30 a.m. on weekdays (in working hours) is determined as a time period, in which the USB memory 300 is connected and function-setting is executed. Alternatively, a time period between the start of afternoon working hours and a predetermined time is determined as the time period, in which function-setting is executed. Alternatively, a time period just before executing a predetermined processing is determined as the time period, in which function-setting is executed. As described above, if a time period, in which function-setting is executed, is determined, the time period is set as a verification-allowed-time-period. Further, verification is not allowed out of the verification-allowed-time-period.

Because of this, even if the second code 20 is unrightfully copied to a USB memory other than the USB memory 300, the time period in which the USB memory can be used is restricted. Further, it is possible to limit a time period in which use of unauthorized USB memories is monitored to a predetermined time period (verification-allowed-time-period). As a result, the high-security measuring system 500 may be realized.

Figure 8:
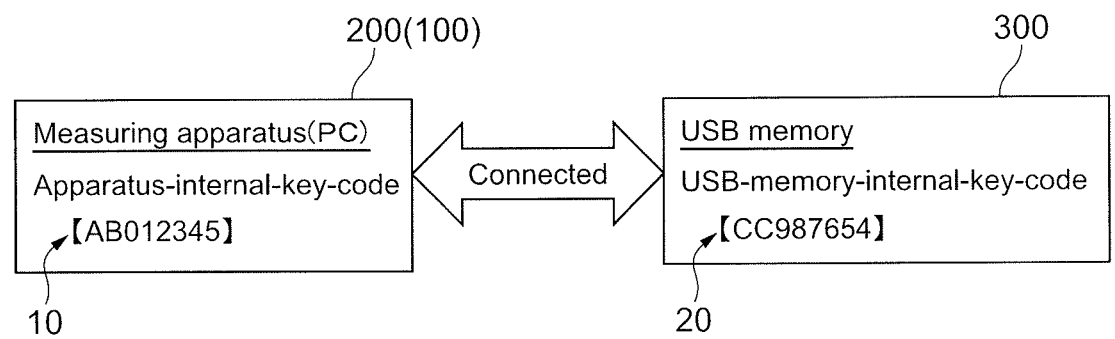
FIG. 8 is a diagram showing a status in which a first code does not match a second code.

In Step 104, as the result of verification by the authentication unit 116, it is determined if authentication is successfully executed. For example, as shown in FIG. 8, if the first code 10 ([AB012345]) does not match the second code 20 ([CC987654]), it is determined that authentication fails (No in Step 104). In this case, the processing is completed.

As shown in FIG. 5, if the first code 10 matches the second code 20, it is determined that authentication is successfully executed. Then the processing proceeds to Step 105, and function-setting is executed. That is, if the authentication unit 116 succeeds in authentication, the execution allowing unit 117 allows execution of a predetermined function out of one or more functions.

Figure 10:
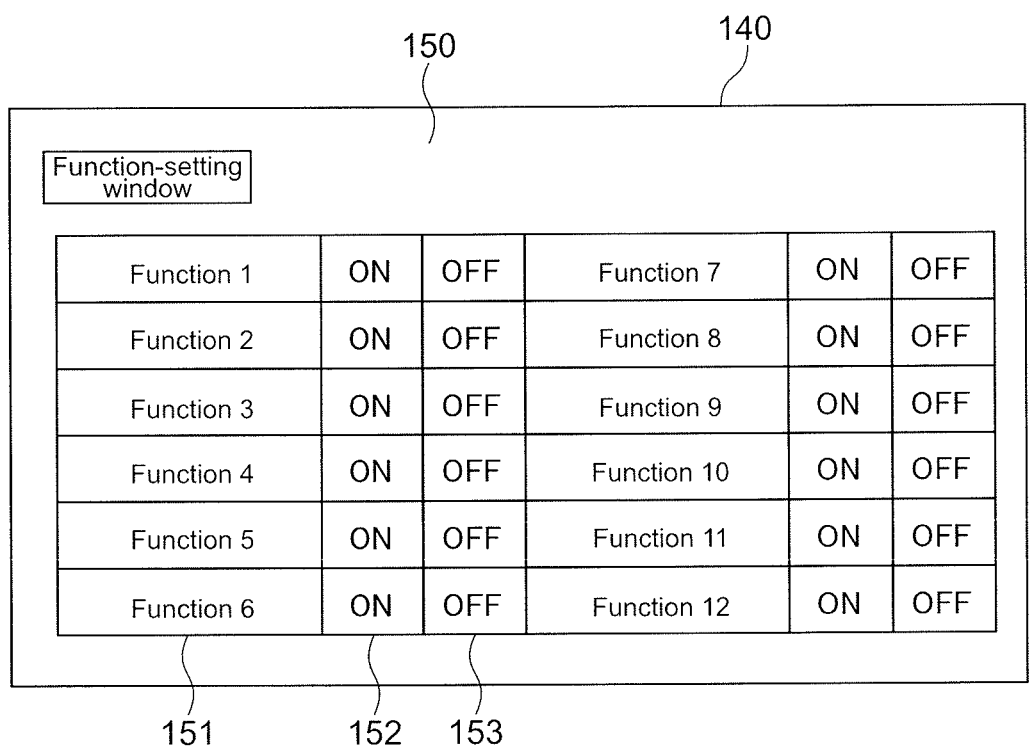
FIG. 10 is a diagram showing an example of a function-setting window, i.e., a first GUI, of this embodiment.

In this embodiment, the execution allowing unit 117 allows execution of a predetermined function in response to an instruction from a user. As shown in FIG. 10, in this embodiment, if the authentication unit 116 executes authentication successfully, the GUI output unit 118 outputs the function-setting window 150. The function-setting window 150 is a first GUI for setting a predetermined function, execution of the function being allowed. The function-setting window 150 is displayed on the display unit 106 or the screen 140 of an external display apparatus. A user operates the function-setting window 150 to thereby input function-setting instructions. The execution allowing unit 117 allows execution of a predetermined function set by using the function-setting window 150.

As shown in FIG. 10, the function-setting window 150 displays the icons 151 representing one or more functions executed by the measuring apparatus 200 (PC 100), and the ON icons 152 and the OFF icons 153, which represent the options, i.e., if execution of the respective functions is allowed or not. A user selects the ON icon 152 for a function, execution of the function being allowed. Meanwhile, a user selects the OFF icon 153 for a function, execution of the function being not allowed. In this manner, function-setting may be executed easily. Note that the function-setting window 150 has any structure. The function-setting window 150 having an arbitrary structure may be used as the first. GUI.

As described above, to remove function-restriction is one of the function-setting. For example, a manager or the like connects the USB memory 300, and the function-setting window 150 is output. The manager or the like selects the ON icon 152 for a function, execution of the function being not allowed (i.e., a function for which the OFF icon 153 is selected). Alternatively, the function-setting window 150 may display icons, which are used to remove function-restriction, and the icon may be selected. The function-restriction may thus be removed.

It is possible to set functions by using the function-setting window 150. Accordingly, for example, a manager or the like of the measuring system 500, who owns the USB memory 300, is capable of easily restricting functions, such that other users owning no USB memories 300 may not use the functions.

In Step 106, the data manager 119 updates the code. That is, if the authentication unit 116 succeeds in authentication, the data manager 119 updates the first code 10 stored in the storage 108 with another code, with which the authentication unit 116 succeeds in authentication, and updates the second code 20 stored in the USB memory 300 with the same code. At this time, the data manager 119 functions as the update unit of this embodiment.

Figure 9:
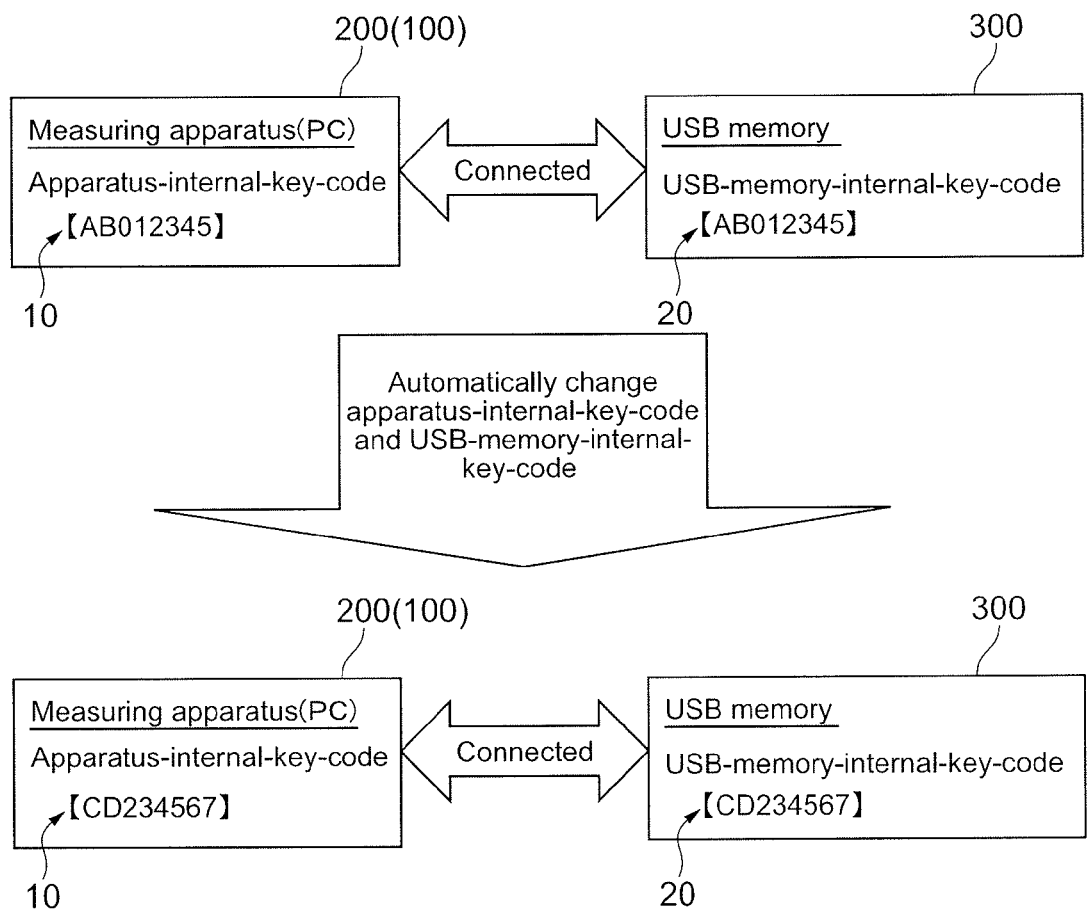
FIG. 9 is a diagram showing an example of a status in which first and second codes are updated.

As shown in FIG. 9, the first code 10 [AB012345] matches the second code 20 [AB012345], and authentication is successfully executed. In this case, the first and second codes 10 and 20 are automatically updated with the character code [CD234567]. Here, because the updated first code 10 [CD234567] matches the updated second code [CD234567], the authentication unit 116 will succeeds in authentication. When the first and second codes 10 and 20 are updated, the processing is completed. Operated by a user, the measuring apparatus 200 is capable of executing a function, which is allowed in the function-setting of Step 105 (function from which restriction is removed).

Note that, in this embodiment, character data is used as authentication data. If a piece of character data matches another piece of character data, authentication is successfully executed, and vice versa. Because of this, matching character data is used as the "other code, with which the authentication unit 116 succeeds in authentication". Instead, another code may be used. Data conforming with another authentication method or another algorithm may be used as the "other code, with which the authentication unit 116 succeeds in authentication" arbitrarily.

Further, the steps of the flowchart of FIG. 4 may be changed. For example, the function-setting of Step 105 may be executed after codes are updated in Step 106. Alternatively, the processing of Step 105 and the processing of Step 106 may be executed in parallel. The other steps may be processed at arbitrary timing, for example.

As described above, the PC 100 (the measuring apparatus 200), i.e., the information processing apparatus of this embodiment, verifies the second code 20 against the first code 10 obtained from the USB memory 300, to thereby execute authenticate the second code 20. If authentication is successfully executed, execution of a predetermined function by the PC 100 is allowed. Further, if authentication is successfully executed, the first code 10 is updated with another code, with which the authentication unit 116 succeeds in authentication, and the second code 20 is updated with the same code. Because the first and second codes 10 and 20 are automatically updated, for example, even if the second code 20 is leaked, it is possible to minimize the effect thereof.

For example, even if the second code 20 is unrightfully copied to a USB memory other than the USB memory 300, this USB memory cannot be used after the first and second codes 10 and 20 are updated. Because of this, unauthorized function-setting by using this USB memory is prevented. Let's say that an unauthorized USB memory is used before the first and second codes 10 and 20 are updated. In this case, because the first and second codes 10 and 20 are updated already, when a manager or the like connects to the authorized USB memory 300, authentication fails. Then the manager or the like easily notices that someone accessed the measuring apparatus 200 unrightfully before he uses the measuring apparatus 200. It is thus possible for him to take measures rapidly (e.g., to update codes again). As a result, it is possible to realize a high-security measuring system.

For example, a hardware switch is sometimes used, or an apparatus holding a password or the like internally is sometimes used to set function-restriction by a manager. Tf a manager wishes to remove function-restriction, he turns on the switch, or inputs the password that the apparatus holds internally. As a result, function-restriction of a measuring apparatus is removed.

However, if a hardware switch is used to remove function-restriction, the switch is operated by the general public, and function-restriction may be removed easily. If a password or the like that an apparatus holds internally is input to set function-restriction, only a person, who knows the password or the like, can remove function-restriction. However, for example, if a user wants someone to remove function-restriction, a password is leaked to someone. As a result, the system security is decreased.

To the contrary, in the measuring system 500 according to this embodiment, the USB memory 300, which stores the second code 20, is required to remove function-restriction. It is thus possible to prevent the measuring apparatus 200 from being accessed unrightfully by the general public. Further, it is possible to remove function-restriction easily by connecting the USB memory 300 to the PC 100. In addition, if a user wants someone to remove function-restriction, he may lend the USB memory 300 to someone. Someone thus removes function-restriction easily. A user does not need to tell a code to someone, but he only needs to lend the USB memory 300 to someone. This prevents a code from being leaked when function-restriction is removed. Even if a key code is leaked, the key code is updated automatically every time function-restriction is removed. Because of this, a user may notice trouble (leak of code when function-restriction is removed) easily. As described above, according to the present invention, for example, it is possible to execute function-setting of the PC 100 and the measuring apparatus 200 easily, and to remove function-restriction easily. Further, it is possible to increase the security of the measuring system.

Second Embodiment

A measuring system according to the second embodiment of the present invention will be described. Hereinafter, description of the configuration and effects similar to those of the measuring system 500 of the above-mentioned embodiment will be omitted or simplified.

Figure 11:
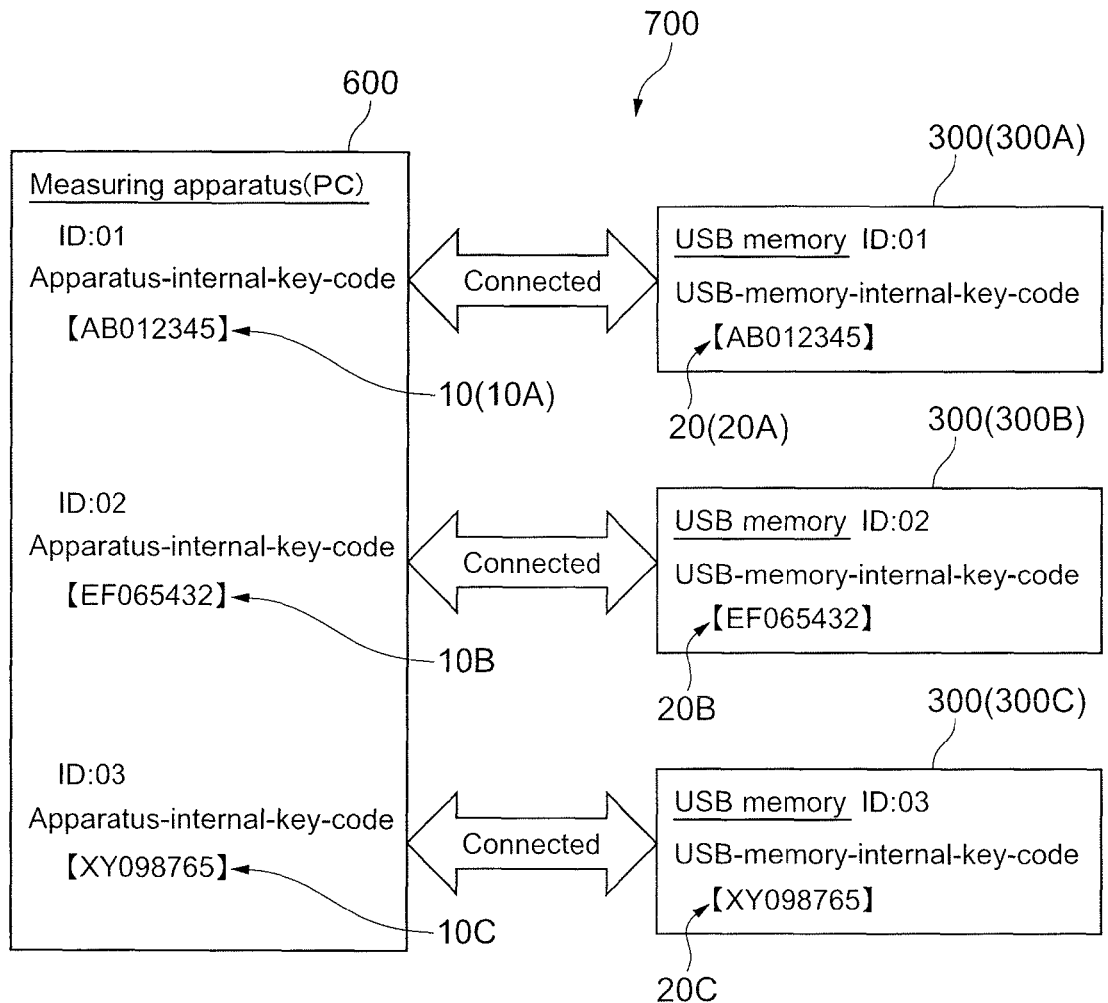
FIG. 11 is a diagram showing an example of the basic configuration of a measuring system of a second embodiment.

FIG. 11 is a diagram showing an example of the basic configuration of the measuring system 700 of this embodiment. In this embodiment, the measuring apparatus 600 functions as an information processing apparatus. It is possible to use the plurality of USB memories 300 when the plurality of USB memories 300 connect to the measuring apparatus 600. The second code 20 of each of the USB memories 300 is verified against the first code 10. Then, if authentication is successfully executed, a function, execution of the function being allowed, is set. In this embodiment, the three USB memories 300A, 300B, and 300C are used. However, two USB memories 300 or four or more USB memories 300 may be used.

Figures 12, 13:
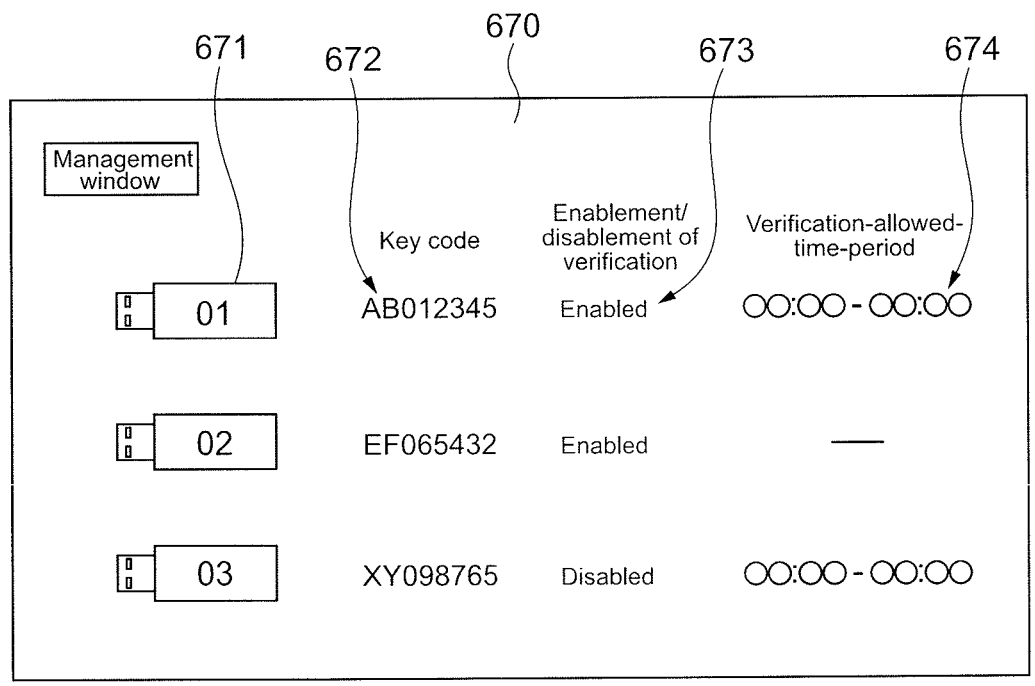
FIG. 12 is a diagram showing an example of a table stored in storage of a measuring apparatus of this embodiment.
FIG. 13 is a diagram showing an example of a management window, i.e., a second GUI, of this embodiment.

FIG. 12 is a diagram showing an example of a table stored in storage of the measuring apparatus 600. As shown in the table 650, the storage of the measuring apparatus 600 stores identification information (IDs) and the plurality of first codes 10. The IDs identify the plurality of USB memories 300, respectively. Each first code 10 is in association with the identification information. Further, as shown in the table 650, verification-allowed-time information and verification-flag information are in association with each ID and stored. Note that any method of setting an ID for each USB memory 300 may be employed.

As described above, the verification-allowed-time-period is information on a time period in which verification is allowed. Verification-allowed-time information is not stored for the USB memory 300B having the ID "02". That is, verification-allowed-time-period is not set for the USB memory 300B, and verification may be executed any time.

The verification-flag information is information on enablement/disablement of verification. If the verification flag "1" is set for a USB memory 300, then verification is enabled for the USB memory 300. When the USB memory 300 connects to the measuring apparatus 600, verification is executed. Note that, at this time, it is determined that if it is in the verification-allowed-time-period arbitrarily. In this embodiment, the verification flag "1" corresponds to "information on enablement of verification".

If the verification flag "0" is set for a USB memory 300, then verification is disabled for the USB memory 300. The second code 20 of the USB memory 300 is not verified against the first code 10. In this embodiment, the verification flag "0" corresponds to "information on disablement of verification". Note that the information on enablement of verification and the information on disablement of verification may not be flags but may be arbitrary various data.

When each USB memory 300 connects to the measuring apparatus 600, processing similar to the processing of FIG. 4 is executed for the USB memory 300. That is, authentication, function-setting, and the like described in the first embodiment are executed for each USB memory 300. For example, let's say that the USB memory 300A having the ID "01" connects to the measuring apparatus 600. Then the authentication unit verifies the second code 20A ([AB012345]) against the first code 10A ([AB012345]), and authenticates the second code 20A ([AB012345]). The second code 20A ([AB012345]) is stored in a target USB memory (USB memory 300A having ID "01") being the authentication-target out of the plurality of USB memories 300. The first code 10A ([AB012345]) is in association with the ID "01" of the target USB memory out of the plurality of first codes 10. Further, when the authentication unit succeeds in authentication, the data manager updates the first code 10A in association with the ID "01" of the target USB memory, and updates the second code 20A stored in the target USB memory (see FIG. 9).

Because it is possible to execute authentication for each of the plurality of USB memories 300, for example, a plurality of managers and the like may manage the measuring system 700. At this time, one of the plurality of USB memories 300 may be kept as a spare USB memory.

Further, in this embodiment, if the authentication unit succeeds in authentication, the GUI output unit outputs a management window as a second GUI. The second GUI is for setting a USB memory, verification of the USB memory being disabled, out of the plurality of USB memories 300. The ID of the USB memory 300, for which disablement of verification is set by using the management window, and information on disablement of verification are in association with each other and stored. That is, in the table 650 of FIG. 12, the verification flag "0" is set in association with the ID of the USB memory 300 for which disablement of verification is set.

FIG. 13 is a diagram showing an example of the management window. The icons 671, the first codes 672, the text data 673, and the verification-allowed-time-periods 674 are displayed on the management window 670. The icon 671 represents a USB memory and shows an ID. The text data 673 shows enablement/disablement of verification. A user operates the operation unit 107 such as a mouse, and data displayed on the management window 670 may be changed accordingly. For example, it is possible to easily change the first code 10, the verification-allowed-time-period, and disablement of verification to enablement of verification. Note that any operation method and the like may be employed to change data. Further, the management window 670 may have any configuration and may be set arbitrarily.

As described above, according to this embodiment, it is possible to arbitrarily set the USB memory 300, verification of the USB memory 300 being disabled. Because of this, for example, if one of the plurality of USB memories 300 is lost, verification of the USB memory 300 may be disabled. For example, let's say that the USB memory 300C having the ID "03" of FIG. 11 is lost. In this case, it is possible to display the above-mentioned management window 670 by connecting another USB memory 300A or 300B to the measuring apparatus 600. A user inputs an instruction to disable verification of the USB memory 300C having the ID "03" by using the management window 670. As shown in the table 650 of FIG. 12, the verification flag "0" is set for the ID "03".

It is possible to prevent the lost USB memory 300C having the ID "03" from being used unrightfully by disabling verification of the USB memory 300C having the ID "03". As a result, it is possible to increase the security of the measuring system 700. Note that a predetermined USB memory (i.e., the spare USB memory 300 for enabling/disabling verification) out of the plurality of USB memories 300 may be kept in a safety box or the like. If a USB memory 300 is lost, the spare USB memory for setting is picked up from the safety box or the like, and is used arbitrarily.

In this embodiment, a new USB memory may be set up by using the management window 670 in place of the lost USB memory 300. For example, in the case where the management window 670 is displayed, a newly-prepared USB memory is connected to another USB port of the measuring apparatus 600. Then an operation is input by using the management window 670, and an instruction to set up a new USB memory is input accordingly. The operation method may be set arbitrarily. For example, an icon and the like for setting up a new USB memory may be displayed arbitrarily, and the icon may be selected.

The data manager of the measuring apparatus 600 provides the ID of the USB memory 300C having the ID "03", verification of the USB memory 300C being disabled, to the new USB memory. The newly-prepared USB memory is thus set up as the USB memory 300C having the ID "03". Further, the data manager changes the information on disablement of verification, which is in association with the ID "03", to information on enablement of verification. As a result, the text data 673 showing enablement of verification is displayed for the USB memory 300C having the ID "03" on the management window 670. In addition, the verification flag "1" is set for the USB memory 300C having the ID "03" in the table 650. When the data manager executes this processing, the data manager functions as the information setting unit of this embodiment.

Next, the data manager updates the first code 10C, which is in association with the ID "03" provided to the new USB memory 300O. Further, the second code 20C, which will be verified against the updated first code 10C and authenticated, is stored in the new USB memory 300C. That is, the first code 10 is stored in the storage of the measuring apparatus again, and the second code 20 is stored in the storage of the USB memory 300C again. Authentication of the first and second codes 10 and 20 will be successfully executed by the authentication unit. As a result, the higher security is attained.

Other Embodiments

The present invention is not limited to the above-mentioned embodiments, and other various embodiments may be realized.

For example, history information, i.e., information on executed verification, may be stored in the storage of the information processing apparatus. For example, information on time/date at/on which a USB memory was connected and verification was executed is stored for the ID of each USB memory. The history information may be referred to by operating the management window, for example. If the history information is referred to, a user may know the history of the executed function-setting in the past, for example. Further, a user may know if the measuring system was used unrightfully or not, for example. Further, if someone accessed the measuring system unrightfully, a user may confirm the accessed time and the like. As a result, the higher security is attained.

Enablement/disablement of verification may be determined based on the history information. For example, the following setting may be established. That is, if a predetermined time passes after the time at which verification was executed the last time (reference point), verification is disabled. To the contrary, if a predetermined time does not pass, verification is disabled.

In the first embodiment, the PC 100 may hold information unique to a USB memory such as a serial number. Further, the unique information may be used to verify a code. As a result, it is possible to prevent another USB memory, to which a second code is copied unrightfully, from being used.

In the second embodiment, one of a plurality of USB memories may be set up as a master, and the other USB memories may be set up as slaves. For example, only a master USB memory is capable of outputting the management window of FIG. 13. Further, a slave USB memory is only capable of setting functions. The measuring system may be set as described above. In this case, managers and the like own slave USB memories, respectively. A master USB memory may be kept in a safety box or the like, and the use of the master USB memory may be managed.

In the first embodiment, the management window of FIG. 13 may be output. That is, the management window may be output irrespective of the number of USB memories to be used, and various settings may be established by using the management window. Moreover, the technical matters described in the first and second embodiments may be combined arbitrarily. That is, a technical matter described in one embodiment may be applied to the other embodiment.

In the above description, a USB memory is used as an external storage medium. Alternatively, another mobile storage medium such as a memory card, e.g., an SD card, various flash memories, or a mobile HDD may be used. Alternatively, any above-mentioned removal storage medium may be used arbitrarily.

Figure 14:
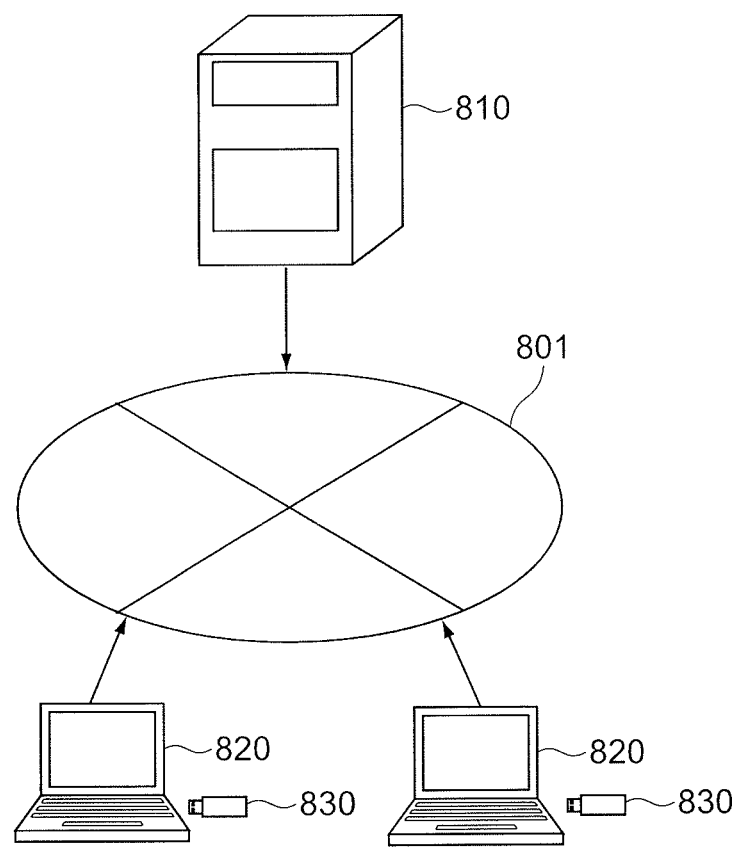
FIG. 14 is a diagram showing an example of the configuration of a network system according to another embodiment of the present invention.

FIG. 14 is a diagram showing an example of the configuration of a network system according to another embodiment of the present invention. The network system 800 includes the network 801, the server apparatus 810, and the one or more client apparatuses 820. The server apparatus 810 is the information processing apparatus according to one embodiment of the present invention, and connects to the network 801. The one or more client apparatuses 820 are capable of connecting to the server apparatus 810 via the network 801. Note that arbitrary number of the client apparatuses 820 may be used.

A computer such as a PC may be used as each of the server apparatus 810 and the client apparatuses 820. Each client apparatus 820 includes a USB port. The USB memory 830, i.e., the external storage medium, is capable of connecting to the USB port. The network 801 is, for example, a WAN (Wide Area Network), a LAN (Local Area Network), a home network, or the like. Any protocol may be employed to configure the network 801.

For example, the server apparatus 810 provides various network services such as network banking and an auction system. A user is capable of using the network service by operating the client apparatuses 820.

The above-mentioned technology of the present invention is applicable to the network system 800. For example, the server apparatus 810 includes storage configured to store the first code. Further, the server apparatus 810 obtains a second code from the USB memory 830 via the network 801. In the example of FIG. 14, the client apparatus 820 retrieves the second code, and sends the retrieved second code to the server apparatus 810 via the network 801.

The authentication unit of the server apparatus 810 verifies the second code against the first code, to thereby execute authentication. Then, if authentication is successfully executed, the execution allowing unit of the server apparatus 810 allows execution of a predetermined function out of one or more functions. For example, the execution allowing unit of the server apparatus 810 allows execution of all the network service or part of the network service. As a result, execution of various kinds of processing such as upload/download of data, various kinds of calculation, and collection of information is allowed to provide the network service. Further, if the present technology is combined with an authentication method in the past, which employs a password, the higher security is realized.

For example, the server apparatus 810 provides network banking service. In this case, execution of functions of the server apparatus 810 is allowed, whereby predetermined processing (e.g., bank transfer, loan repayment, etc.) may be executed via the client apparatuses 820. As a matter of course, this is merely an example, and the present invention is not limited to this example.

Further, if authentication is successfully executed, the update unit of the server apparatus 810 updates the first code stored in the storage and the second code stored in the USB memory 830. For example, the first code is updated. The second code is updated via a network with a new code, which will be authenticated by the authentication unit based on the updated first code. Any method of updating the second code via a network may be used.

As described above, it is possible to realize a high-security network system by applying the present invention. As a result, users may use various services protected for security purpose (e.g., network banking) at ease. Note that the various technologies according to the above-mentioned embodiments of the present invention may be applied to the network system 800.

At least two features out of the features of the above-mentioned respective embodiments may be combined.

What is claimed is:

1. An information processing apparatus configured to execute at least one function, comprising:
    a memory configured to store;
        a plurality of pieces of identification information identifying a plurality of external storage media, respectively, and
        a plurality of first codes in relation with the plurality of pieces of identification information, respectively; and
    a processor configured
        to obtain a second code from a target storage medium out of the plurality of external storage media, the target storage medium being an authentication-target,
        to verify the obtained second code against a first code of the plurality of first codes in relation with a piece of identification information of the target storage medium to thereby authenticate the second code, and
        to, when the second code is authenticated,
            output a first GUI (Graphical User Interface) for setting a predetermined function out of the at least one function,
            allow execution of the predetermined function set by using the first GUI,
            update the first code stored in the memory with another first code, the first code being in relation with the identification information of the target storage medium,
            update the second code stored in the target storage medium with another second code such that authentication based on the updated first code succeeds,
            output a second GUI for setting up an external storage medium, verification of the external storage medium being disabled, out of the plurality of external storage media, and
            store, in the memory, a piece of identification information of the external storage medium, disablement of verification of the external storage medium being set by using the second GUI, and information on disablement of verification in association with each other.

2. The information processing apparatus according to claim 1,
    wherein the processor is further configured
        to provide the piece of identification information of the external storage medium, disablement of verification of the external storage medium being set, to another external storage medium,
        to change the information on disablement of verification in association with the piece of identification information to information on enablement of verification,
        to update the first code in relation with the piece of identification information provided to the other storage medium, and
        to cause the other external storage medium to store the second code such that the processor verifies the second code against the updated first code to succeed in authentication.

3. The information processing apparatus according to claim 2, wherein
    the memory is configured to store history information, the history information being time information at which verification is executed.

4. The information processing apparatus according to claim 1, further comprising:
    a receiver configured to obtain information at a current time, wherein
    the memory is configured to store information on a time period in which verification is allowed, and
    the processor is configured to execute verification based on the information at the current time when the current time is within a time period in which verification is allowed.

5. The information processing apparatus according to claim 1, wherein
    the external storage medium is a mobile storage medium.

6. The information processing apparatus according to claim 1, wherein
    the external storage medium is a memory including a USB (Universal Serial Bus) interface.

7. An information processing apparatus configured to execute at least one function, comprising:
    a memory configured to store;
        a plurality of pieces of identification information identifying a plurality of external storage media, respectively, and
        a plurality of first codes in relation with the plurality of pieces of identification information, respectively; and
    a processor configured
        to obtain a second code from a target storage medium out of the plurality of external storage media via a network, the target storage medium being an authentication-target,
        to verify the obtained second code against a first code of the plurality of first codes in relation with a piece of identification information of the target storage medium to authenticate the second code, and
        to, when the second code is authenticated,
            output a first GUI (Graphical User Interface) for setting a predetermined function out of the at least one function,
            allow execution of the predetermined function set by using the first GUI,
            update the first code stored in the memory with another first code, the first code being in relation with the identification information of the target storage medium,
            update, via the network, the second code stored in the target storage medium with another second code such that authentication based on the updated first code succeeds, output a second GUI for setting up an external storage medium, verification of the external storage medium being disabled, out of the plurality of external storage media, and
store, in the memory,
a piece of identification information of the external storage medium,
disablement of verification of the external storage medium being set by using the second GUI, and
information on disablement of verification in association with each other.

8. An information processing method, executed by a computer configured to execute at least one function, the method comprising:
storing;
a plurality of pieces of identification information identifying a plurality of external storage media, respectively, and
a plurality of first codes in relation with the plurality of pieces of identification information, respectively;
obtaining a second code from a target storage medium out of the plurality of external storage media, the target storage medium being an authentication-target;
verifying the obtained second code against a first code of the plurality of first codes in relation with a piece of identification information of the target storage medium to authenticate the second code; and
when the second code is authenticated,
outputting a first GUI (Graphical User Interface) for setting a predetermined function out of the at least one function,
allowing execution of the predetermined function set by using the first GUI,
updating the stored first code with another first code, the first code being in relation with the identification information of the target storage medium,
updating the second code stored in the target storage medium with another second code such that authentication based on the updated first code succeeds,
outputting a second GUI for setting up an external storage medium, verification of the external storage medium being disabled, out of the plurality of external storage media, and
storing a piece of identification information of the external storage medium, disablement of verification of the external storage medium being set by using the second GUI, and information on disablement of verification in association with each other.

9. A non-transient computer readable storage medium that stores a computer program, the computer program, when executed by a processor, causing a computer to perform a process comprising:
storing;
a plurality of pieces of identification information identifying a plurality of external storage media, respectively, and
a plurality of first codes in relation with the plurality of pieces of identification information, respectively;
obtaining a second code from a target storage medium out of the plurality of external storage media, the target storage medium being an authentication-target;
verifying the obtained second code against a first code of the plurality of first codes in relation with a piece of identification information of the target storage medium to authenticate the second code; and
when the second code is authenticated,
outputting a first GUI (Graphical User Interface) for setting a predetermined function out of the at least one function,
allowing execution of the predetermined function set by using the first GUI,
updating the stored first code with another first code, the first code being in relation with the identification information of the target storage medium,
updating the second code stored in the target storage medium with another second code such that authentication based on the updated first code succeeds,
outputting a second GUI for setting up the external storage medium, verification of an external storage medium being disabled, out of the plurality of external storage media, and
storing a piece of identification information of the external storage medium, disablement of verification of the external storage medium being set by using the second GUI, and information on disablement of verification in association with each other.

10. An information processing system, comprising:
an information processing apparatus configured to execute at least one function; and
a plurality of external storage media, wherein
each of the plurality of the external storage media is configured to store a unique first authentication code, and
the information processing apparatus includes
a memory configured to store,
a plurality of pieces of identification information identifying the plurality of external storage media, respectively, and
a plurality of second authentication codes in relation with the plurality of pieces of identification information, respectively, and
a processor configured
to obtain a first authentication code from a target storage medium out of the plurality of external storage media, the target storage medium being an authentication-target,
to verify the obtained first authentication code against a second authentication code of the plurality of second authentication codes in relation with a piece of identification information of the target storage medium to authenticate the first authentication code, and
to, when the first authentication code is authenticated,
output a first GUI (Graphical User Interface) for setting a predetermined function out of the at least one function,
allow execution of the predetermined function set by using the first GUI,
update the second authentication code stored in the memory with another second authentication code, the second authentication code being in relation with the identification information of the target storage medium,
update the first authentication code stored in the target storage medium with another first authentication code such that authentication based on the updated second authentication code succeeds,
output a second GUI for setting up an external storage medium, verification of the external storage medium being disabled, out of the plurality of external storage media, and
store, in the memory, a piece of identification information of the external storage medium, disablement of verification of the external storage medium being set by using the second GUI, and information on disablement of verification in association with each other.

* * * * *